US006854643B2

United States Patent
Manico et al.

(10) Patent No.: US 6,854,643 B2
(45) Date of Patent: Feb. 15, 2005

(54) IDENTIFICATION AND DETECTION MEANS FOR NON-CONVENTIONAL NEGATIVES

(75) Inventors: Joseph A. Manico, Rochester, NY (US); Ronald M. Wexler, Rochester, NY (US); Jeffrey L. Hall, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 46 days.

(21) Appl. No.: 10/242,863

(22) Filed: Sep. 13, 2002

(65) Prior Publication Data

US 2004/0050921 A1 Mar. 18, 2004

(51) Int. Cl.[7] .............................................. G06F 17/00
(52) U.S. Cl. ...................................... 235/375; 235/487
(58) Field of Search ................................ 235/375, 487, 235/491, 493; 358/1.9, 3.27, 509, 518; 428/543, 13

(56) References Cited

U.S. PATENT DOCUMENTS

| 5,025,274 A | | 6/1991 | Pagano | |
|---|---|---|---|---|
| 5,213,372 A | | 5/1993 | Kuo | |
| 5,477,353 A | * | 12/1995 | Yamasaki | 358/487 |
| 5,596,202 A | * | 1/1997 | Arakawa | 250/484.4 |
| 5,660,925 A | * | 8/1997 | Cooley et al. | 428/304.4 |
| 5,801,856 A | * | 9/1998 | Moghadam et al. | 358/527 |
| 5,808,667 A | * | 9/1998 | Sugiyama | 348/96 |
| 5,949,551 A | * | 9/1999 | Miller et al. | 358/408 |
| 6,027,820 A | * | 2/2000 | O'Hagan et al. | 428/543 |
| 6,297,874 B1 | | 10/2001 | Ikeda et al. | |
| 6,430,372 B2 | * | 8/2002 | Ishihara et al. | 396/208 |
| 6,490,418 B1 | * | 12/2002 | Kamata et al. | 396/311 |
| 6,515,766 B1 | * | 2/2003 | Matama | 358/1.9 |
| 6,584,281 B2 | * | 6/2003 | Kamata | 396/60 |
| 6,631,011 B2 | * | 10/2003 | Fredlund et al. | 358/1.15 |

FOREIGN PATENT DOCUMENTS

EP 0 625 725 11/1994

* cited by examiner

Primary Examiner—Michael G. Lee
Assistant Examiner—Kimberly D. Nguyen
(74) Attorney, Agent, or Firm—Frank Pincelli (57) ABSTRACT

A processed photosensitive media having an image there on which is designed to have the image digitally scanned and manipulated in accordance with a specific algorithm prior to being printed and/or displayed and a system for automatically determining if the media is scan-only media prior to printing and/or displaying an image thereon. The media may have associated therewith an indicia that the media is designed to be scanned and digitally manipulated in accordance with a predetermined algorithm for printing and/or displaying the image.

1 Claim, 8 Drawing Sheets

IDENTIFICATION AND DETECTION MEANS FOR NON-CONVENTIONAL NEGATIVES

FIELD OF THE INVENTION

This invention relates in general to the photofinishing industry and more particularly to methods and apparatus intended to minimize the possibility of producing inferior and unacceptable fulfillment, such as prints, from developed negatives.

BACKGROUND OF THE INVENTION

There now exist, in the photo industry, non-conventional films and development processes, which are employed for advantageous reasons, such as reducing the development time.

In the conventional optical printing process, the sensitized print paper is exposed by a light source that has shown through the negative. This method relies on very specific exposure reaction curves designed into the emulsions of the negative film, its development process, and the coatings on the print paper, so that the combination of negative, print paper, and illumination source produces a print that is faithful in its representation of the original scene that was photographed. All processes must therefore be closely adhered to, particularly the development of the negative.

With the advent of digital printing methods and apparatus, much greater control during the printing phase is possible. This in turn has allowed deviation from conventional film and the conventional development process. With this enablement, the developed film is scanned, converting the image information into electronic form, and the fulfillment, for example producing a print, is done separately. In the interim, with the image information represented as digital data, the image can be corrected for the effects of a non-conventional film and/or development. With these methods, the developed negatives are considered to be 'Scan-Only', because they will produce inferior or unacceptable results if prints are subsequently produced by the conventional optical printing method. Such poor results cause disappointment for the consumer. The consumer may not accept such prints, further resulting in wasted time and materials for the fulfillment provider. Therefore, there is a need to easily identify such scan-only negatives to avoid optically printing from them.

SUMMARY OF THE INVENTION

In accordance with one aspect of the present invention there is provided a processed photosensitive media having an image thereon, which is designed to have the image digitally scanned and manipulated in accordance with a specific algorithm prior to being printed and/or displayed, the media having directly associated therewith an indicia that the media is designed to be scanned and digitally manipulated in accordance with the algorithm for printing and/or display.

In accordance with another aspect of the present invention there is provided a method for printing and/or displaying images obtained by scanning a photosensitive media that has been processed, comprising the steps of:

automatically analyzing the photosensitive media so as to determine if a notice is present that the media has been processed in accordance with a non-conforming development system;

scanning the photo sensitive media so as to obtain a digital record of the image provided thereon if the notice is present;

manipulating the digital record in accordance with a predetermined algorithm if it has been found that the media has been processed in accordance with a non-conforming development system;

printing and/or displaying the digital image that has been manipulated in accordance with the algorithm.

In accordance with yet another aspect of the present invention there is provided a method for printing or displaying an image obtained from scanning a photosensitive media having an image thereon, comprising the steps of:

automatically analyzing the photosensitive media to determine if the photosensitive media has been processed in accordance with a non conforming development system such that the photosensitive media is not appropriate for optical printing;

scanning the photosensitive media so as to obtain a digital record of the image;

applying an algorithm to the digital record if the image has been processed in accordance with a non-conforming development system such that the images obtained can be printed or displayed in a normal condition.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
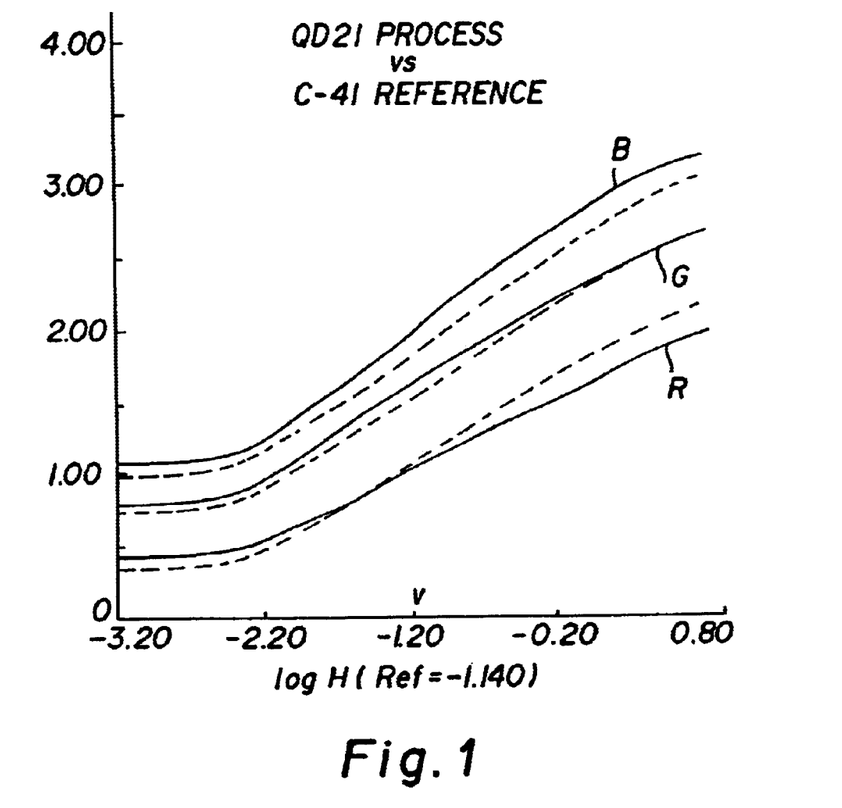
FIG. 1 is a comparative graph of two different film development processes.

A non-conventional film or non-conventional development of a conventional film can cause the resulting densities of the negatives to be different than conventional film and processing. FIG. 1 is a representative graph, comparing the resultant density curves for the conventional C-41 film (manufactured by Eastman Kodak), and non-conventional QD21 film (manufactured by Konica Corp.) development processes. When a digital print process is used, the non-conventionally developed negative's density response can be automatically adjusted to match the conventional curves, such that the prints made from these differently processed negatives would then look the same. This can be done by knowing the characteristics of the developed non-conventional film, scanning the film to obtain a digital record of the images on the film, and using an algorithm designed to manipulate the digitally scanned images to obtain the desired result. When the film is developed so as to obtain the images on the film from the latent images, the initial characteristics of the film (e.g., that the film is of the scan-only type and the particular type of film it is) are known.

This methodology can be used with all types of digital printing apparatus, e.g.: CRT printers, and those not using sensitized paper, such as Laser and Inkjet dye/pigment/wax Disposition, Thermal Dye Sublimation, and toner-fused Electro-Photographic.

However, when photo consumers later decide to have additional reprints made from their negatives, these scan-only negatives may not be easy to distinguish from conventional negatives by standard techniques such as visual observation, or DX code reading. The present invention discloses various methods that provide an indication of the type of film and/or development process that was used to produce the film negatives and that can be used to identify the appropriate algorithm needed to manipulate the image.

In a preferred embodiment of the present invention, establishments that develop exposed film also provide an identification service for identifying that the developed film is a scan-only film. This is accomplished by providing indicia on the film or the cassette containing the film, for example, but not limited to, a mark, sticker, coloring, exposure, or legend.

Figures 2, 3:
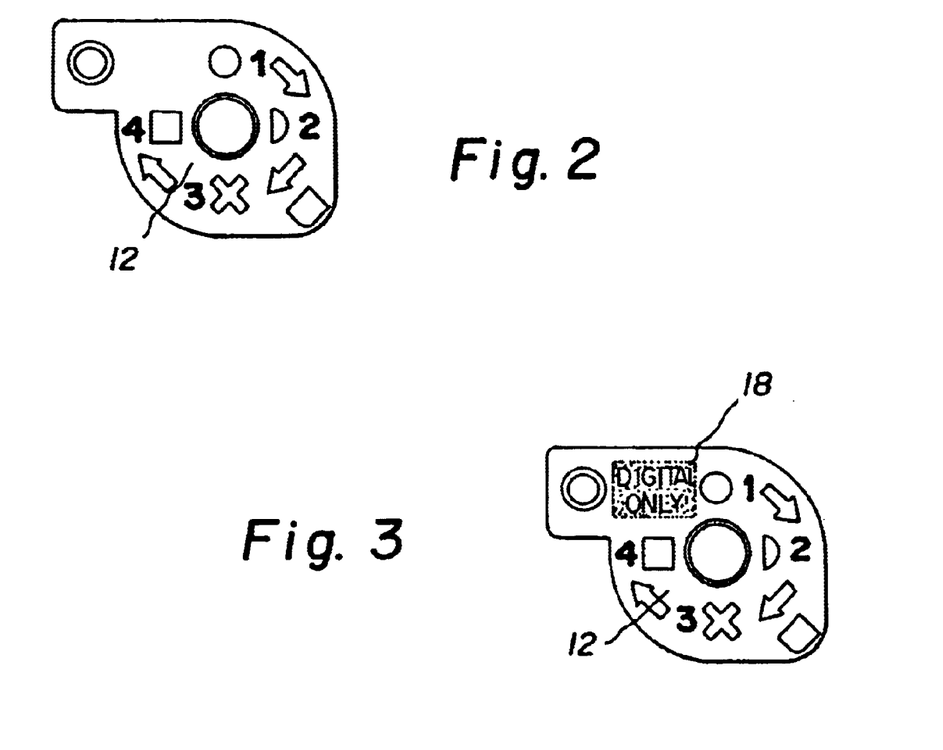
FIG. 2 is a prior art illustration of the film cassette for the APS film system.
FIGS. 3, 4, 5a, and 5b are illustrations of various embodiments of the present invention.
Figure 4:
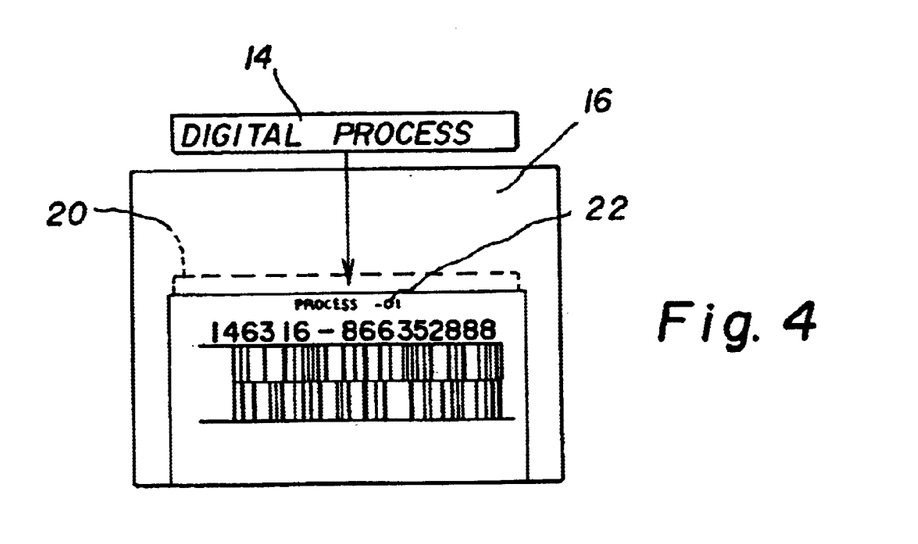

FIGS. 3, 4, 5a, and 5b illustrate various human-observable means for identifying the film as a scan-only film in accordance with the present invention. FIG. 3 shows the placement of a sticker 18 on to the side of the film cassette 12. Placement of the sticker 18 on the cassette 12 is advantageous because it is one place that is almost always looked at by the photofinisher. FIG. 4 shows a sticker 14 that is to be placed at the top of cassette 12 at the rectangle indicated by dashed outline 20, over the C-41 process indication area 22.

Figure 5A:
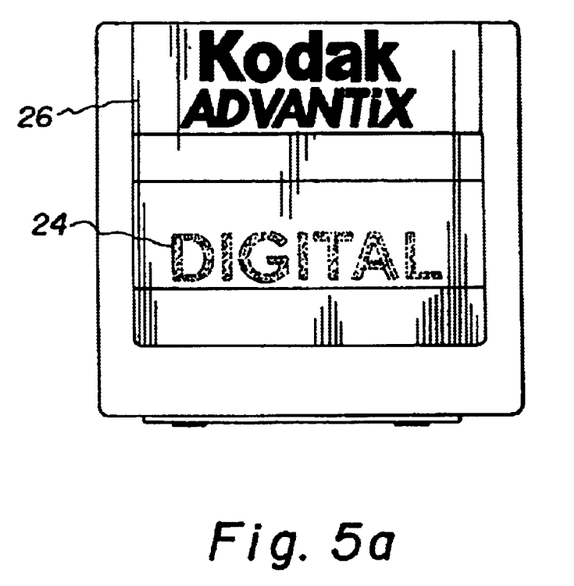
Figure 5B:
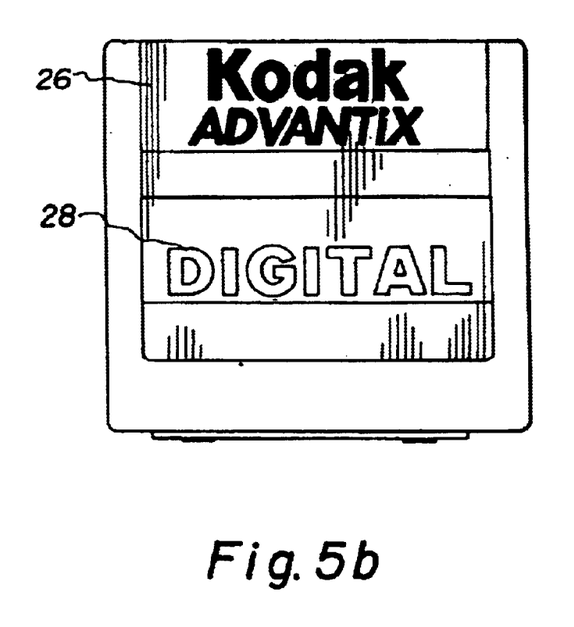

FIG. 5a shows a light gray stamping 24, of a legend identifying the contents as Digital process negatives, in the 'notes' area of the cassette label 26. The level of opacity of the ink allows it to not obscure original markings on said label, and the ink's lightness still allows the area to be used for written notes. In a similar embodiment, FIG. 5b shows the application of an identifying legend in the same 'notes' area of the cassette label 26, where the letters are in outline form 28, providing the same benefits of the embodiment of FIG. 5a.

Other embodiments of indicia locations include: on the negative's protective sleeve, on the index print, or on the outer envelope. The indication could be unique coloring for any of the packaging: cassette, protective sleeve, or outer envelope.

In another embodiment, staining or coating the scan-only developed film provides the indication. Preferably, colorants that absorb light in the ultraviolet or in the infrared range can be applied to render the scan-only film opaque to such light. Suitable detecting apparatus is required to later detect this human-invisible marking for identifying that the film is a scan-only film. The detecting apparatus 31 in the embodiment illustrated by FIG. 6a includes a illumination device 32, a detector 34 sensitive to the illumination wavelength of illumination device 32, and a controller 36 to, for example, prevent optical printing and/or provide a human-visible indication to initiate intervention. The detecting device is provided within an optical printer (not shown). The illumination device 32 is normally energized when developed film 30 is in place. An unstained conventional film 30 will allow a beam 62 of illumination to pass through, resulting in the detector 34 being in the 'on' state. This activates the controller 36, which in turn enables the mechanism of the printing apparatus to operate in its' normal mode to, for example, expose a photographic media (such as photographic paper) from light passing through the film. In addition the controller may also energizes a human-visible indicator 42 intended for human observation 38 that indicates normal printing operation.

Figure 6A:
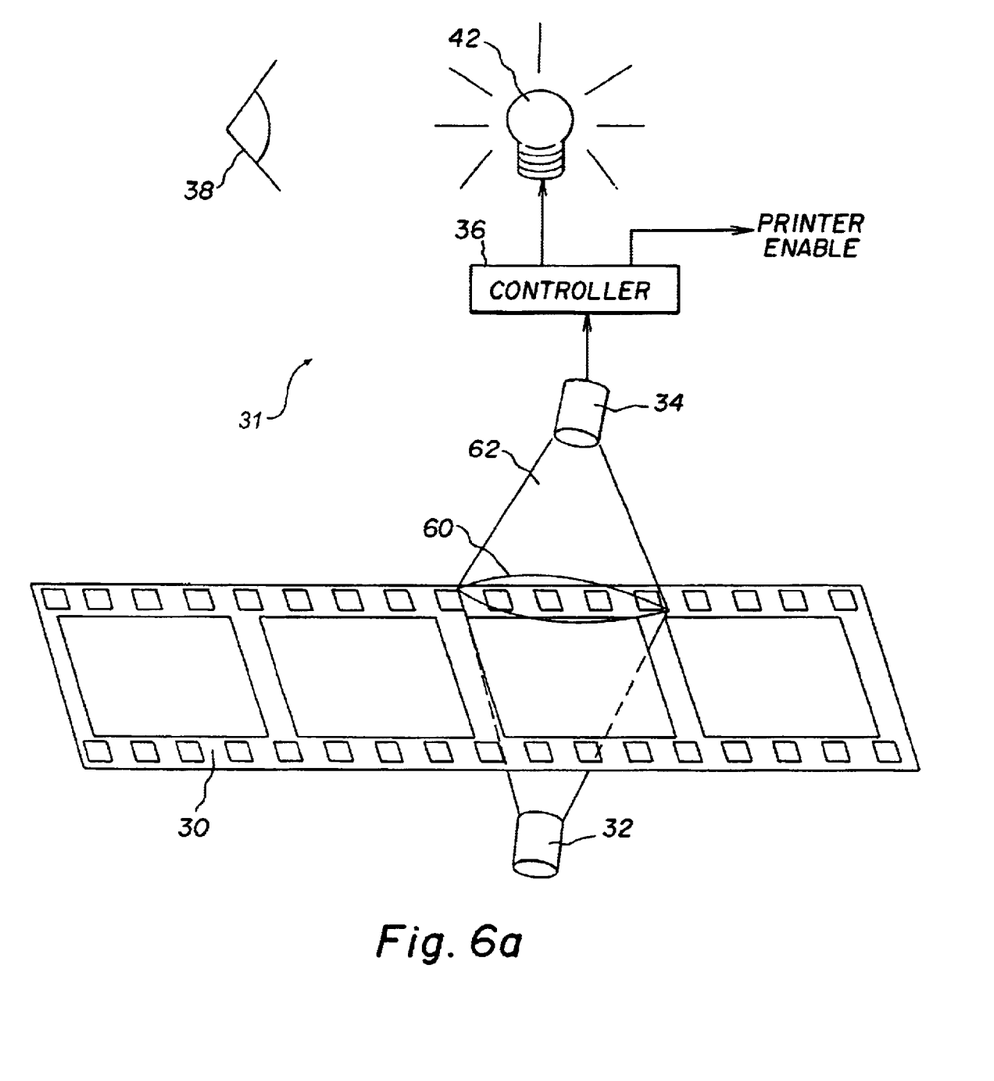
FIG. 6a is an illustration of a transmissive embodiment in an active state.
Figure 6B:
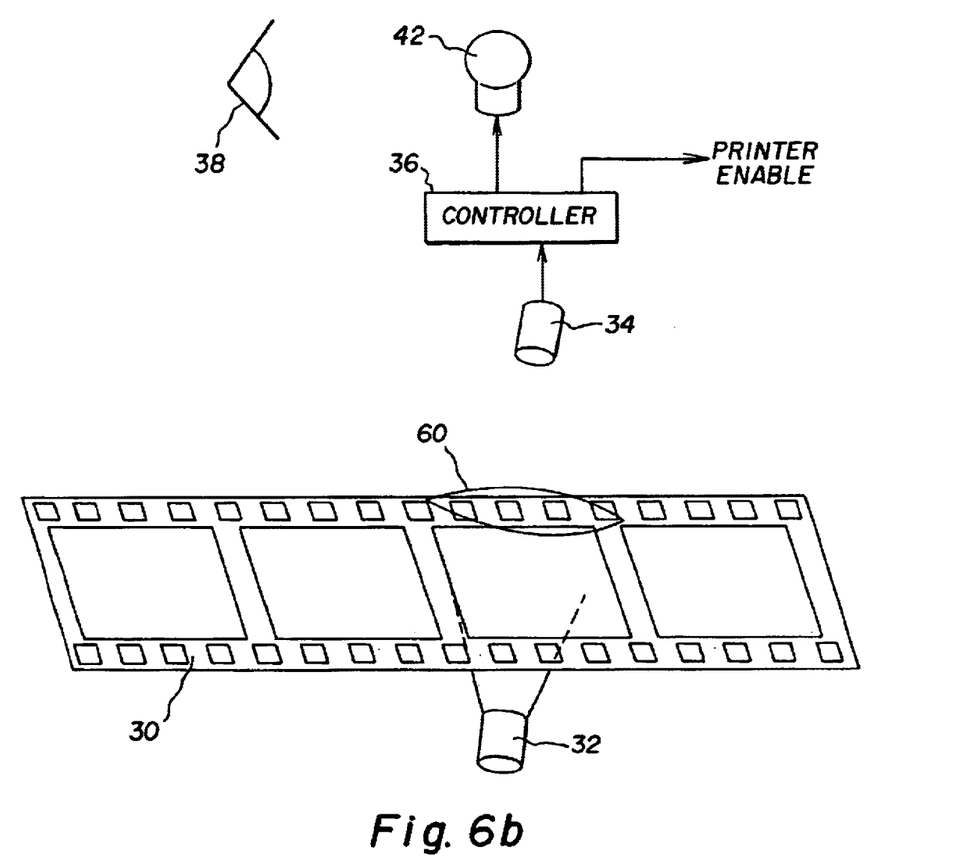
FIG. 6b is an illustration of the embodiment shown in FIG. 6a, with the illumination beam blocked by absorption.

Referring to FIG. 6b, for the case when the film 30 is non-conventional and therefore stained as previously discussed, the beam 62 of illumination will not pass through, and the detector 34 will be in the 'off' state, providing no activation signal to the controller 36. Thus, in this condition the printer will not allow optical printing of the film. However, having been automatically determined that the film can not be optically printed, the film can be scanned by an appropriately provided digital scanner, the image manipulated in accordance with the appropriate algorithm for that film as determined by any code or identification obtained, and forwarded to a separate or optionally provided digital printer for printing of the image.

The relative states of the example of FIGS. 6a and 6b are arbitrarily chosen, and may be of any arrangement suitable for the requirements of the printing equipment. To allow the economical use of available, small diameter components, implementation of this embodiment would require the positioning of at least one optical element in the beam path, such as a lens, allowing the diameter of the beam of illumination to match the major dimension of the exposure frame where it passes through the negative. This is to assure that all light passing through the film anywhere in the frame, is directed to the detector. In FIG. 6a, for example, the lens 60 refracts any passed light 62 from the illuminator 32 to the detector 34.

Figure 6C:
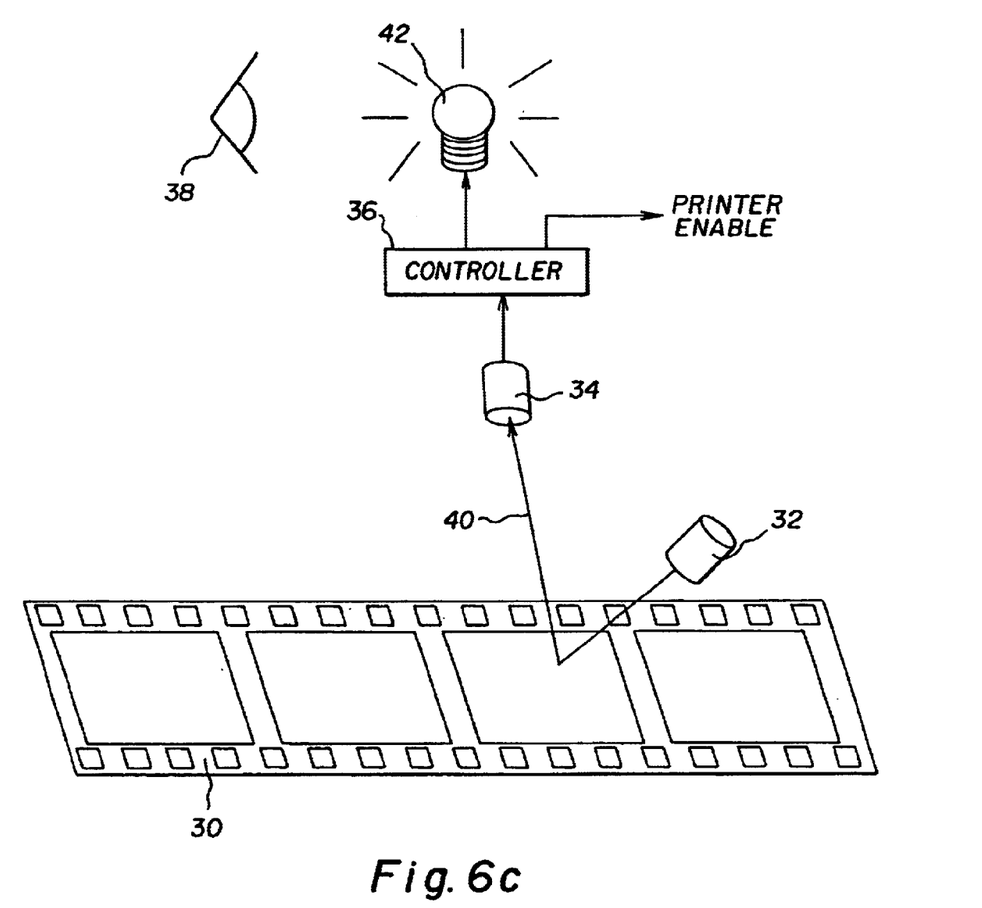
FIG. 6c is an illustration of a reflective embodiment, with the illuminator energized and a conventional film in place.

FIG. 6c illustrates an alternate embodiment of detecting when a scan-only film has been provided for optical printing in accordance with the present invention. In this embodiment the same applied colorants that absorb in the ultraviolet or infrared as previously described are used, but detecting device does not require any optical element. In this embodiment the illumination device 32 and detector 34 are arranged such that the detector 34 receives a directed incident reflection of the illumination beam 40 off of the film 30. Stained, non-conventional negatives absorb the light of the beam sufficiently to keep the detector 34 in the 'off' state. Unstained, conventional negatives allow the reflection. This then provides the two states as just described for FIGS. 6a and 6b.

In an alternate embodiment of the present invention there may not be provided an indicia or other notice that the film is a non-conventional film. For example the film may go through a pre-scan process and the image analyzed. For example, but not limited to, a histogram of the scanned images may be developed. By looking at the results of the histogram, it can be readily determined that the film is a non-conventional media that may require a different type of manipulation.

Figure 7:
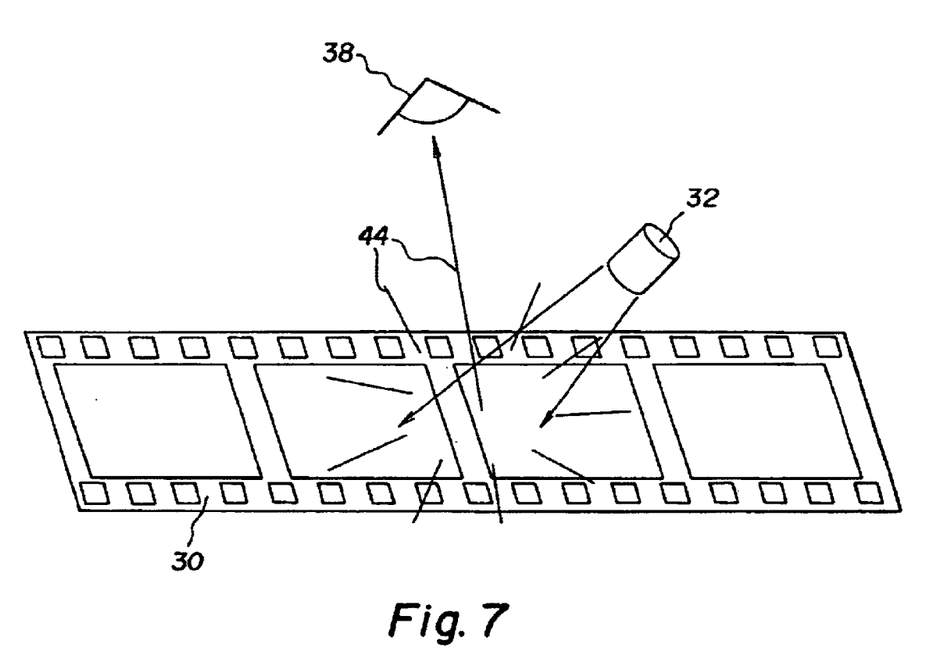
FIG. 7 is an illustration of an embodiment with an illuminator energized and operating to produce a glow effect.

Alternatively, providing human-visible indication of a scan-only film may be advantageous, for example to allow manual segregation of conventional and non-conventional negatives. Therefore, in another embodiment shown in FIG. 7, the colorant is a human visible colorant. For example, a fluorescing dye that absorbs in the UV and emits in the visible may be used, thus producing a slight glow 44 to an observer 38, when illuminated by a UV emitting illuminator 32. This indicia is otherwise non-obscuring. Automation could still be provided by apparatus for visible light detection and printer control. Examples of fluorescing dye would be Phorwhite P or Phorwhite REU, both used as brighteners in a paper process.

If these colorants are water soluble, they can be added to the last process solution, typically a water wash tank, in the film development apparatus (a typical film process used for developing exposed film), and thereby uniformly stain the processed film. This is useful if the process only generates scan-only film. If the process is also used to generate optical negatives as well, then the water soluble dyes could be sprayed only on the processed film that is not optically compatible thus providing a single processing sequence with the ability to selectively provide the indicia on the scan-only negatives.

In another embodiment, applying colorants/dyes/stains that are visible in normal light, for example along an edge of a film to identify it as scan-only, is possible and here disclosed, but not preferred because they may obscure manufacturer's markings, such as frame numbers, film speed, film type, etc.

Figure 8:
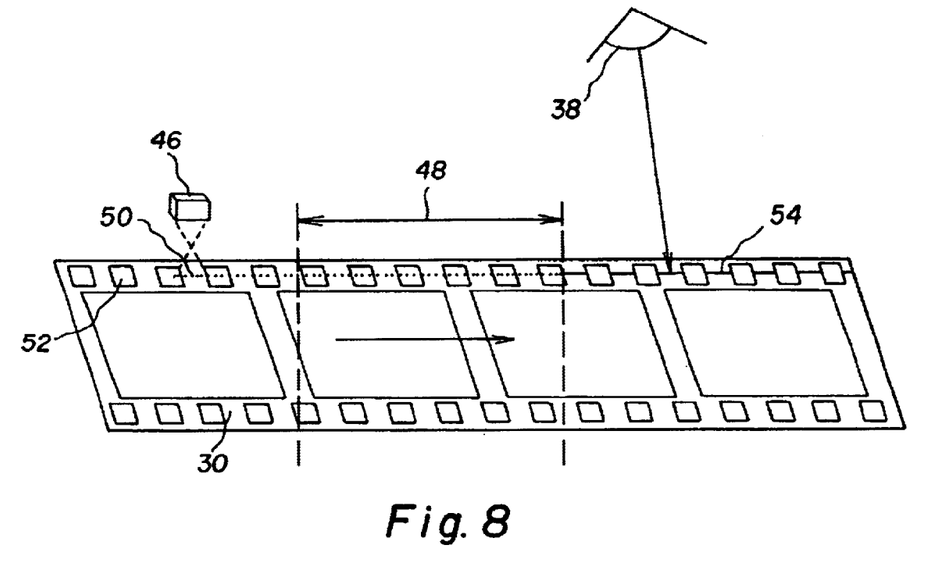
FIG. 8 is an illustration of a location where indicia may be placed on 135 mm strip film.

In another embodiment that provides human-visible indication for 135 mm strip film, referring to FIG. 8, an indicia can be formed by a thin line exposure 50, in the intrack direction through the perforations 52 along the side of the film 30 just prior to development 48, by means of a light source 46 within the light-tight portion of the development apparatus, which is focused at the lateral center of said perforations as the film strip is transported along the development path. For example, a red LED [Light Emitting Diode] 46 is energized to produce a cyan line 54 after the development 48 of the film 30.

Figure 9:
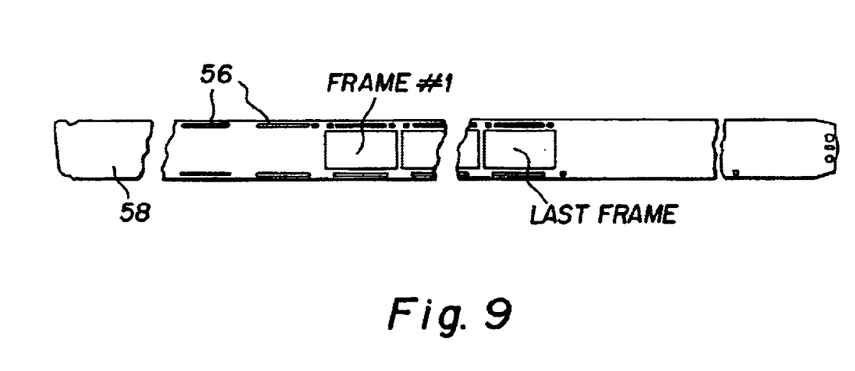
FIG. 9 is an illustration of a location where a magnetic indicia may be imprinted on APS format negatives.

In another embodiment for APS [Advanced Photo System] film, machine-readable identification may be provided by writing to the magnetic coating, for later process determination. Indicated in FIG. 9 are two locations 56, near the leader end 58, which are suitable for this purpose. In another embodiment, the photofinisher may need only to move an indicator into view. This would be designed into the film cassette by the manufacturer. FIG. 2 illustrates one such type of mechanism, as employed by the APS system for status indication.

Since the reason for identifying these alternately-processed negatives is to prevent the uncorrectable error of making prints optically, the indicia might simply come to mean or state: "Scan-Only", "Digital Print Only", "Digital Only", or just "Digital", rather than identifying any specific non-conventional film and/or development process used.

The invention has been described in detail with particular reference to certain preferred embodiments thereof, but it will be understood that variations and modifications can be effected within the scope of the invention.

| PARTS LIST | |
|---|---|
| 12 | Film cassette—side view |
| 14 | Sticker—long |
| 16 | Film cassette—front view |
| 18 | Sticker—small |
| 20 | Dashed outline |
| 22 | Printing on label |
| 24 | Light gray stamping |
| 26 | Cassette manufacturer's label |
| 28 | Letter outline stamping |
| 30 | Negative |
| 32 | Illumination |
| 34 | Detector |
| 36 | Controller |
| 38 | Human observer |
| 40 | Illumination beam |
| 42 | Human-visible indicator |
| 44 | Fluorescent glow |
| 46 | Small aperture light source |
| 48 | Film development process |
| 50 | Thin-line exposure |
| 52 | Perforations |
| 54 | Cyan line |
| 56 | Magnetic coating |
| 58 | Leader of film strip |
| 60 | Lens |
| 62 | Un-obscured illumination |

What is claimed is:

1. A method for printing and/or displaying images obtained by scanning a photosensitive media that has been processed in a non-conventional processing system different from which said photosensitive media was designed to be processed, comprising the steps of:

automatically analyzing said photosensitive media so as to determine if a notice is present that said media has been processed in accordance with a non-conforming development system;

scanning said photo sensitive media so as to obtain a digital record of said image provided thereon if said notice is present;

manipulating said digital record in accordance with a predetermined algorithm if said digital record has been found that said media has been processed in accordance with a non-conforming development system;

printing and/or displaying said digital image that has been manipulated in accordance with said algorithm.

* * * * *